United States Patent [19]
Fitzwater

[11] Patent Number: 5,971,561
[45] Date of Patent: Oct. 26, 1999

[54] AIRPORT FIELD LIGHT PROTECTOR

[76] Inventor: Donald B. Fitzwater, 701 N. 8th St., Beatrice, Nebr. 68310

[21] Appl. No.: 08/854,192

[22] Filed: May 9, 1997

[51] Int. Cl.[6] ........................................................ F21S 1/02
[52] U.S. Cl. ...................... 362/145; 362/153; 362/153.1; 362/431; 362/441; 362/470
[58] Field of Search ................................ 362/153, 153.1, 362/145, 431, 441, 470

[56] References Cited

U.S. PATENT DOCUMENTS

| | | | |
|---|---|---|---|
| 4,104,711 | 8/1978 | Carter | 362/153 |
| 5,122,798 | 6/1992 | Kaolian | 340/947 |
| 5,436,812 | 7/1995 | Stewart | 362/153.1 |
| 5,556,189 | 9/1996 | Wallis | 362/153.1 |
| 5,582,477 | 12/1996 | Reinert, Sr. | 362/153.1 |
| 5,669,691 | 9/1997 | Barrow | 362/153.1 |

*Primary Examiner*—Thomas M. Sember
*Assistant Examiner*—John A. Ward
*Attorney, Agent, or Firm*—Lawrence G. Fridman

[57] ABSTRACT

An airport field light protector consists of a flange-shaped body having an interior area, a central portion and a peripheral portion extending upwardly from the central portion. An opening is formed within and passing through the central portion of the body. In use, the opening circumvents a post of an airfield light and at least the central portion of the protector is elevated from a base of the light and the ground. Thus, an enclosed space is formed between the interior area of the protector, a base of the light and the ground inhibiting growth of vegetation and preventing erosion of the ground around the airfield light.

10 Claims, 2 Drawing Sheets

5,971,561

AIRPORT FIELD LIGHT PROTECTOR

FIELD OF THE INVENTION

This invention relates to lights for airport runways and the like, and, more particularly, it relates to devices adapted for protection of such lights by prevention of vegetation growth and soil erosion at their base area.

BACKGROUND OF THE INVENTION

To improve visibility of runways, taxiways, etc., elevated airport field lights such as: runway, taxiway, threshold edge lights, etc. are customarily used in aviation industry.

Proliferation of airport field lighting is also a result of the tendency for great majority of airports to accept not only daylight but night traffic as well. Thus, depending upon the size of an airport, a number of airfield lights are typically found to be in hundreds or thousands. As such, airport operators typically spend a great deal of time in maintaining airfield lights in compliance with safety and other requirements. These factors contribute, often substantially, to an overall high cost of airport maintenance.

Since the airfield lights are typically of relatively short height, an important problem facing airports in general and relatively small, field airports in particular, is that vegetation, such as weeds, may obscure such lights from pilot's view. Consequently, a pilot may not be able to visually ascertain a position of his aircraft relative to the edge of the runway or taxiway that is marked by the airfield lights. Obviously, such condition could result in safety hazards.

The Federal Aviation Administration has certain minimum standards with respect to the intensity and visibility provided by elevated airport runway, taxiway and threshold edge lights. The necessity to meet these standards has created a need for often expensive specialized equipment and trained personnel to maintain airport runways and taxiways and other airfield lights in operational condition. Typically, there are two different operational steps (and corresponding equipment) involved in removal of vegetation from airport grounds. Initially, a large size equipment, such as industrial lawn mowers, is involved in removal of vegetation from the runways/taxiways and from the strips separating the airfield lights from the runways/taxiways. However, such bulky equipment cannot remove the vegetation from the area in the direct vicinity of the airfield lights. This makes it necessary to utilize another type of smaller equipment for such direct removal of vegetation. Thus, use of such equipment and services of specially trained maintenance personnel are essential to safe operation of airports.

Additionally, to suppress vegetation growing, such chemicals as herbicides and ground sterilizers are used by airport maintenance personnel contributing to ecological pollution.

However, the process of soil sterilization which leads to elimination of vegetation, may result in soil erosion in the direct vicinity of a base of airfield lights. Such process is particularly common for the field airports in the areas having sandy soil where winds and airstreams resulting from operation of aircraft engines blow away soil from the area surrounding the base of the light. This is because, in a sandy soil environment, upon elimination of vegetation, there is very little to keep soil together around the base of the light. Thus, wind blows the soil away, producing depressions around the base of the lights which collect environmental water. This leads to further safety hazards.

Thus, it has been a long felt and unsolved need for a simple, inexpensive and reliable device enabling airport operators to suppress vegetation growth and prevent soil erosion in the area surrounding the base of an airfield light without polluting environment.

SUMMARY OF THE INVENTION

One aspect of the invention provides a combination of an airport field light and light protector. This combination consists of an airport field light having a base, a post having an exterior part and extending upwardly from the base. A lighting fixture is situated atop the conduit. A light protector is defined by an interior area, a central portion and peripheral portion extending outwardly from the central portion. At least the central portion of the protector is elevated from the base, so that an enclosed space is formed between the interior area of the protector and the ground inhibiting growth of vegetation. The peripheral portion is formed having a uniform thickness which is substantially greater than the thickness of the central portion. An opening is formed within the central portion. The central portion can be formed with a plurality of circumferentially positioned serrations, whereby said opening is produced by removal of a part of the central portion delineated by the serration.

According to another aspect of the invention, the protector is formed with a slit extending radially in one direction from the opening and through the peripheral portion. The protector can be also formed with a plurality of longitudinal serrations extending from the opening radially in one direction through the peripheral portion. The longitudinal slit can be produced by removing a part of the protector delineated by the longitudinal rows of serrations. The slit is adapted to facilitate positioning of the protector on the airport field light. The protector can be made of flexible, waterproof material such as recyclable plastic or recyclable rubber. The protector can be also made of cement. An outside boundary of the peripheral portion can be formed either circular or rectangular-shaped configuration.

A further aspect of the invention provides an airport field light protector having a body defined by an interior area, a central portion and a peripheral portion extending outwardly from the central portion. An opening is formed in the central area of the body. In an assembled condition of the light protector, the opening circumvents a vertical part of an airfield light and the central portion is elevated from the ground, so that an enclosed space is formed between the interior area of the protector and the ground inhibiting growth of vegetation.

BRIEF DESCRIPTION OF THE DRAWINGS

Other advantages and features of the invention are described with reference to exemplary embodiments, which are intended to explain and not to limit the invention, and are illustrated in the drawings in which.

DESCRIPTION OF THE PREFERRED EMBODIMENT

Figure 1:
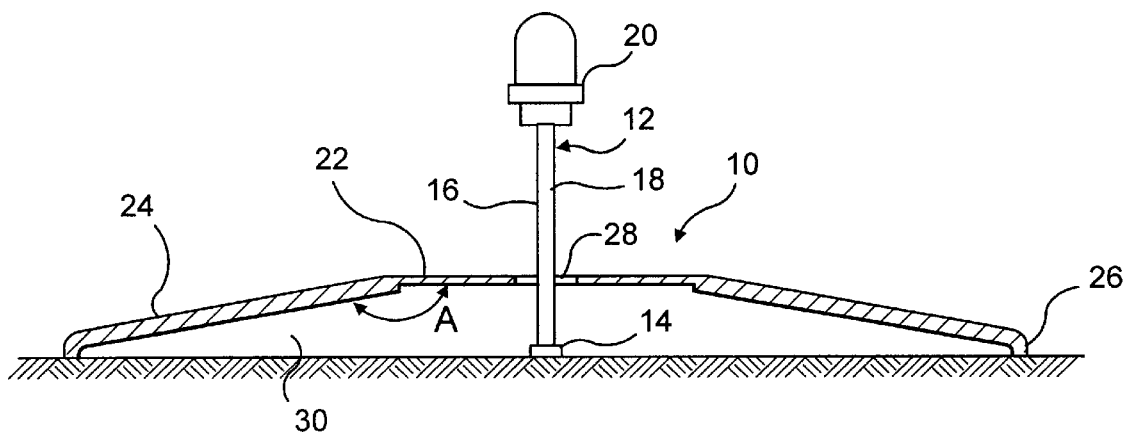
FIG. 1 is a cross-sectional view showing an airport field light-light protector combination of the invention.
Figure 2:
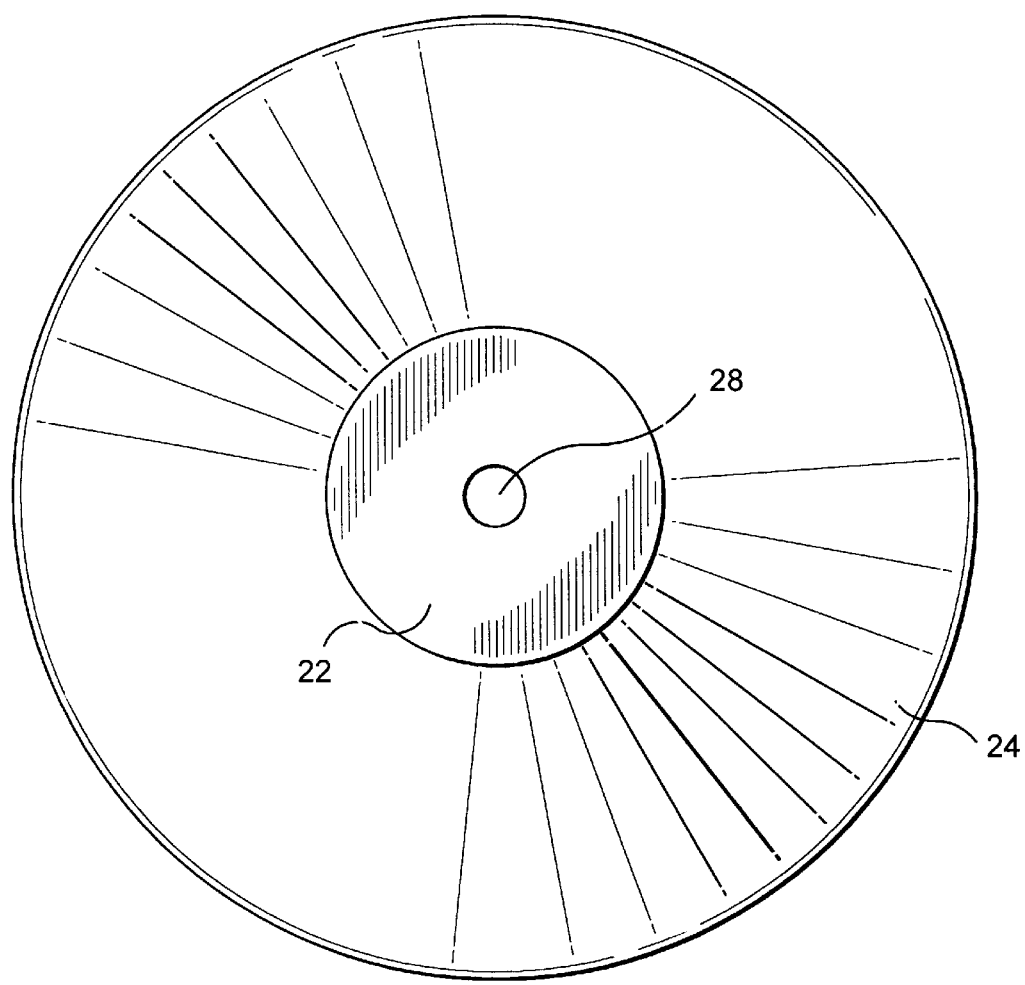
FIG. 2 is a top plan view of one embodiment of the protector.
Figure 3:
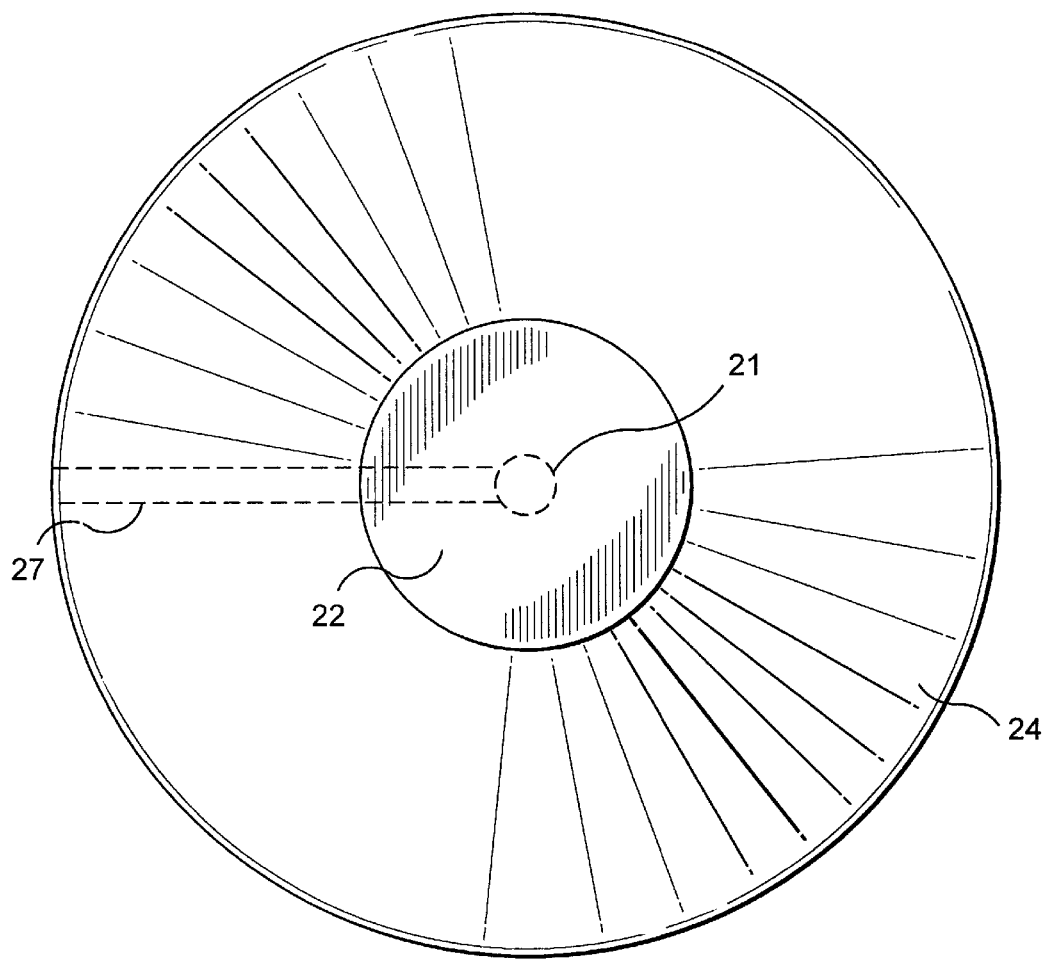
FIG. 3 is a top plan view of another embodiment of the protector.

Referring now in detail to the drawings in general and to FIGS. 1–3 wherein a light protector 10 of the invention is best illustrated. The light protector in combination with airfield light 12 is typically used to suppress vegetation growth and to prevent soil erosion about the base of the light and ultimately to improve visibility of such areas of airports as runways, taxiways, etc. The conventional airfield light preferably includes a base 14 which normally rests upon the ground or other substantially horizontal supporting surface. Extending upwardly from the base 14 is a post or conduit 16 which is hollow inside to accommodate electrical cables. An exterior part 18 of the post is formed typically having substantially cylindrical configuration. A lighting fixture assembly 20 is mounted atop the post 16. An adaptor can be provided to secure connection between the lighting assembly and the post 16. The post including the lighting fixture can be mounted to the base by a breakable coupling.

As best illustrated in FIGS. 1–3, a flange-type light protector 10 is formed having a substantially flat central portion 22 and a peripheral portion 24 extending outwardly from the central portion. At the bottom of the protector, a substantially vertical engaging area 26 can be provided to secure a proper engagement between the protector and the ground.

The peripheral portion 24 is interposed at an obtuse angle A to the substantially flat central portion 22. In the preferred embodiment of the invention, the engaging area 26 is positioned at a right angle to the ground. An opening 28 is formed within the central portion 22. In operation of the invention, the opening is adapted for passage therethrough of the post 16. This provides better support for the post and the field light during operation of the invention.

Figure 4:
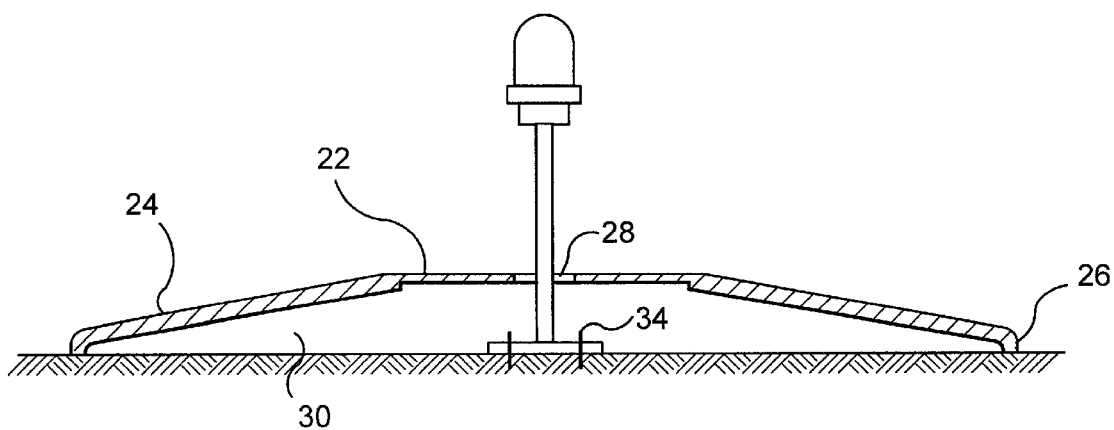
FIG. 4 is a cross-sectional view showing the protector positioned on the airfield light having a baseplate.

As illustrated in FIGS. 1 and 4, the peripheral portion 24 and engaging area 26 of the protector are formed having a uniform thickness which is substantially greater than the thickness of the central portion 22. Such reduced thickness of the central portion substantially facilitates formation therein of the opening 28. This is specifically so when the protector 10 is initially manufactured as a solid body and the opening is custom-sized on the site to accommodate the exterior part of the post of a selected field light. To facilitate such on-site formation of the opening, the central portion 22 can be provided with a plurality of circumferentially-positioned serrations 21 (See FIG. 3), so that the opening can be produced by puncturing and removal of the part of the central portion designated by such serrations.

To facilitate proper installation, the protector, as illustrated in FIG. 3, can be also formed with a radial slit extending through the entire peripheral portion. The slit can also extend through the central portion 22. To simplify on-site production of the slit, the protector can be initially formed with a plurality of longitudinal serrations 27 penetrating through at least a substantial part of the thickness of the protector. Such arrangement facilitates installation of the protector without initial removal of the light fixture.

In the embodiment of FIG. 1, the outside periphery of the base does not extend substantially beyond the exterior part of the post.

Another embodiment of the field light is illustrated in FIG. 4. In this embodiment, a baseplate 32 is formed having a plurality of bolt-holes arranged around the periphery thereof. A plurality of mounting bolts 34 is provided with threaded shanks extending through the bolt-holes for securing the baseplate to a support surface such as a concrete pad, for example, including threaded bolt anchors or the like for receiving the threaded shanks of the mounting bolts. In this embodiment, the post and the light fixture are also mounted to the baseplate by a breakable coupling. By providing light protectors of different outside diameters, the present invention can accommodate airport field lights having bases of any conventional dimensions.

The light protector of the present invention can be made of any flexible material such as recyclable plastic or recyclable rubber. In certain circumstances, the protector of the invention can be made as a cement or concrete structure.

In FIGS. 1–4, the protector 10 is shown having a substantially circular outside boundary. Nevertheless, it is obvious to a person of ordinary skill in the present art that any suitable configuration of the protector (such as, for example, rectangular shaped protector) is within the scope and contemplations of the invention.

The dimensions of the protector are not critical, but satisfactory results can be achieved with a substantially circular protector having the diameter ranging between six and twenty-four inches, whereas the central portion is spaced about 2 inches above the ground.

In operation, prior to positioning of the protector, a lighting fixture is typically removed from a field airport light and, if necessary, an opening is formed within the central portion. Then, the protector is positioned on the light. Removal of vegetation from the area surrounding such light prior to installation of the protector facilitates better engagement between the engaging area 26 of the protector and the ground. Upon assembly, an enclosed space 30 is formed between the interior area of the protector and the ground, effectively suppressing growth of vegetation about the airfield light. Furthermore, such enclosed space prevents soil erosion due to climate conditions and prevents accumulation of environmental water at the base of the light. Moreover, engagement between the elevated opening 28 and the post 12 provides better support and stabilizes proper positioning of the entire airfield light assembly.

What is claimed is:

1. A preformed airport field light protector adapted to be custom-sized to accommodate a preselected field light, said light protector comprising:

an integral light protector body made from a resilient material, said body having a solid substantially flat central portion and a peripheral portion extending outwardly from the central portion at an obtuse angle, said peripheral portion having a uniform thickness being substantially greater than the thickness of the central portion, said central portion is formed with a plurality of circumferentially positioned serrations and said peripheral portion is formed with a plurality of longitudinal serrations, whereby during on a site installation of the light protector, an opening going through the central portion and an elongated slit passing through the peripheral portion are formed by puncturing and removal of parts of the protector body designated by said serrations.

2. The preformed airport field light protector of claim 1, wherein said resilient material is a waterproof material.

3. The preformed airport field light protector of claim 2, wherein said material is chosen from the group consisting of a recyclable plastic and recyclable rubber.

4. The preformed airport field light protector of claim 1, wherein said peripheriphal portion is formed having a substantially circular shaped outside configuration.

5. The preformed airport filed light protector of claim 1, wherein said peripheral portion is formed having a substantially vertical engaging area.

6. A preformed airport field light protector comprising:

an integral light protector body made from a resilient material, said body having a solid substantially flat central portion and a peripheral portion extending outwardly from the central portion at an obtuse angle, said central portion being formed with a plurality of circumferentially positioned serrations and said peripheral portion being formed with a plurality of longitudinal serrations, whereby during on a site installation of the light protector an opening going through the central portion and an elongated slit passing through the peripheral portion are formed by puncturing and removing of parts of the protector body designated by the serrations.

7. The preformed airport field light protector of claim 6, wherein said resilient material is a waterproof material.

8. The preformed airport field light protector of claim 7, wherein said material is chosen from the group consisting of a recyclable plastic and recyclable rubber.

9. The preformed airport field light protector of claim 6, wherein said peripheral portion is formed having a substantially circular shaped outside configuration.

10. The preformed airport filed light protector of claim 6, wherein said peripheral portion is formed having a substantially vertical engaging area.

* * * * *